United States Patent
Kindelsberger et al.

(10) Patent No.: US 10,585,575 B2
(45) Date of Patent: Mar. 10, 2020

(54) VISUALIZING UI TOOL FOR GRAPH CONSTRUCTION AND EXPLORATION WITH ALTERNATIVE ACTION TIMELINES

(71) Applicant: Oracle International Corporation, Redwood Shores, CA (US)

(72) Inventors: Julia Kindelsberger, Munich (DE); Daniel Langerenken, Foster City, CA (US); Korbinian Schmid, San Mateo, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 96 days.

(21) Appl. No.: 15/609,629

(22) Filed: May 31, 2017

(65) Prior Publication Data
US 2018/0349002 A1 Dec. 6, 2018

(51) Int. Cl.
*G06F 3/0484* (2013.01)
*G06T 11/20* (2006.01)
(Continued)

(52) U.S. Cl.
CPC ........ *G06F 3/04847* (2013.01); *G06F 3/0484* (2013.01); *G06F 16/904* (2019.01);
(Continued)

(58) Field of Classification Search
CPC .................................. G06F 19/00; G06F 8/34
See application file for complete search history.

(56) References Cited

U.S. PATENT DOCUMENTS

| 4,613,946 A | 9/1986 | Forman |
| 5,515,487 A | 5/1996 | Beaudet |

(Continued)

OTHER PUBLICATIONS

Tutorials, "Comparing Workflows", https://www.atlassian.com/git/tutorials/comparing-workflows, dated Apr. 28, 2014, 50 pages.
(Continued)

*Primary Examiner* — Rayeez R Chowdhury
(74) *Attorney, Agent, or Firm* — Hickman Palermo Becker Bingham LLP; Brian N. Miller

(57) ABSTRACT

Techniques herein organize and display as branches the historical versions of filtrations of a property graph in a way that suits interactive exploration. In embodiments, a computer loads metadata that describes versions of filtration of a graph that contains vertices interconnected by edges. Based on the metadata, the computer displays, along a timeline, version indicators that each represents a respective historical version of filtration of the graph. The computer displays, responsive to receiving an interactive selection of a particular version indicator of the plurality of version indicators, a particular version of filtration of the graph that is represented by the particular version indicator. Subsequences of versions for the timeline may be organized as branches that may be interactively created and merged. Branching and merging are integrated into the general lifecycle of graph filtration. A version timeline may be presented and operated as a tool for historical navigation and speculative exploration.

24 Claims, 10 Drawing Sheets

(51) Int. Cl.
*G06F 16/904* (2019.01)
*G06F 16/901* (2019.01)

(52) U.S. Cl.
CPC ........ *G06F 16/9024* (2019.01); *G06T 11/206* (2013.01); *G06F 2203/04806* (2013.01)

(56) References Cited

U.S. PATENT DOCUMENTS

| | | | |
|---|---|---|---|
| 6,400,383 B1 | 6/2002 | Geisler | |
| 6,486,896 B1* | 11/2002 | Ubillos | G06F 3/04855 715/784 |
| 6,774,899 B1 | 8/2004 | Ryall | |
| 8,499,284 B2 | 7/2013 | Pich | |
| 8,527,909 B1 | 9/2013 | Mullany | |
| 8,713,063 B2 | 4/2014 | Abrams | |
| 8,810,576 B2 | 8/2014 | Duplessis | |
| 8,910,084 B2 | 12/2014 | Helfman | |
| 8,937,618 B2 | 1/2015 | Erez | |
| 8,990,675 B2 | 3/2015 | Folting | |
| 9,092,744 B2 | 7/2015 | Tito | |
| 9,262,537 B2 | 2/2016 | Kim | |
| 9,466,138 B2 | 10/2016 | Singh | |
| 9,477,732 B2 | 10/2016 | Helfman | |
| 9,495,777 B2 | 11/2016 | Srivastava | |
| 9,508,167 B2 | 11/2016 | Kim | |
| 9,519,677 B2 | 12/2016 | Wong | |
| 9,600,603 B2 | 3/2017 | Weise | |
| 9,658,943 B2 | 5/2017 | Gounares | |
| 9,705,815 B2 | 7/2017 | Mattson | |
| 9,710,544 B1 | 7/2017 | Smith | |
| 9,734,040 B2 | 8/2017 | Gounares | |
| 9,740,368 B1 | 8/2017 | Love | |
| 9,836,183 B1 | 12/2017 | Love | |
| 9,836,508 B2 | 12/2017 | Morton | |
| 9,836,524 B2 | 12/2017 | Bayliss | |
| 9,864,672 B2 | 1/2018 | Seto | |
| 9,911,211 B1 | 3/2018 | Damaraju | |
| 10,268,735 B1 | 4/2019 | White | |
| 2002/0161736 A1 | 10/2002 | Beygelzimer | |
| 2002/0161853 A1* | 10/2002 | Burak | G06Q 40/00 709/218 |
| 2004/0015480 A1 | 1/2004 | Federighi | |
| 2005/0007383 A1 | 1/2005 | Potter | |
| 2006/0156246 A1* | 7/2006 | Williams | G06F 16/58 715/764 |
| 2007/0266039 A1 | 11/2007 | Boykin | |
| 2008/0297753 A1* | 12/2008 | Wang | G03F 7/701 355/67 |
| 2010/0063785 A1 | 3/2010 | Pich | |
| 2010/0161680 A1 | 6/2010 | Atre | |
| 2010/0179844 A1* | 7/2010 | LaFergola | G07C 5/008 701/31.4 |
| 2011/0115814 A1* | 5/2011 | Heimendinger | G06F 3/04883 345/619 |
| 2011/0148880 A1 | 6/2011 | De Peuter | |
| 2011/0249002 A1 | 10/2011 | Duplessis | |
| 2011/0267350 A1 | 11/2011 | Cubera | |
| 2012/0005631 A1 | 1/2012 | B'Far | |
| 2013/0103719 A1 | 4/2013 | Gotz | |
| 2013/0187941 A1 | 7/2013 | Noon | |
| 2013/0212479 A1 | 8/2013 | Willis | |
| 2013/0229416 A1 | 9/2013 | Krajec | |
| 2013/0238667 A1 | 9/2013 | Carvalho | |
| 2013/0250060 A1 | 9/2013 | Andersson | |
| 2013/0282889 A1 | 10/2013 | Tito | |
| 2014/0244623 A1 | 8/2014 | King | |
| 2014/0244667 A1 | 8/2014 | Bararsani | |
| 2014/0320498 A1 | 10/2014 | Ajitomi | |
| 2014/0354650 A1 | 12/2014 | Singh | |
| 2014/0372458 A1 | 12/2014 | Jurca | |
| 2015/0089366 A1 | 3/2015 | Beckett | |
| 2015/0112750 A1 | 4/2015 | Grichnik | |
| 2015/0138203 A1 | 5/2015 | Nachmanson | |
| 2015/0262396 A1* | 9/2015 | Devarajan | G06F 16/248 345/440.1 |
| 2015/0339835 A1 | 11/2015 | Mohr | |
| 2015/0347559 A1 | 12/2015 | Elias | |
| 2015/0370919 A1 | 12/2015 | Bornhoevd | |
| 2016/0048787 A1 | 1/2016 | Shinkuma | |
| 2016/0063037 A1 | 3/2016 | Savkli | |
| 2016/0103887 A1* | 4/2016 | Fletcher | G06F 16/334 707/722 |
| 2016/0110476 A1 | 4/2016 | Shinkuma | |
| 2016/0125093 A1 | 5/2016 | Cho | |
| 2016/0140166 A1 | 5/2016 | Schechter | |
| 2016/0304872 A1* | 10/2016 | Elowitz | C12N 15/635 |
| 2016/0342737 A1 | 11/2016 | Kaye | |
| 2016/0350389 A1* | 12/2016 | Kloke | G06F 16/9024 |
| 2017/0042495 A1 | 2/2017 | Matsuzaki | |
| 2017/0109907 A1 | 4/2017 | Hamedani | |
| 2017/0140068 A1 | 5/2017 | Oh | |
| 2017/0154445 A1 | 6/2017 | Maruhashi | |
| 2017/0177681 A1 | 6/2017 | Potiagalov | |
| 2017/0177744 A1 | 6/2017 | Potiagalov | |
| 2017/0185655 A1 | 6/2017 | Jahankhani | |
| 2017/0195854 A1 | 7/2017 | Shi-Nash | |
| 2017/0200293 A1 | 7/2017 | Solem | |
| 2017/0221240 A1 | 8/2017 | Stetson | |
| 2017/0255945 A1 | 9/2017 | McCord | |
| 2017/0323463 A1 | 11/2017 | Leiba | |
| 2017/0351406 A1 | 12/2017 | Rossi | |
| 2017/0357429 A1 | 12/2017 | Dixon | |
| 2017/0371879 A1 | 12/2017 | Jang | |
| 2018/0017746 A1 | 1/2018 | Stanfill | |
| 2018/0025035 A1 | 1/2018 | Xia | |
| 2018/0025093 A1 | 1/2018 | Xia | |
| 2018/0025361 A1 | 1/2018 | Ferrarons | |
| 2018/0068406 A1 | 3/2018 | Van De Sande | |
| 2018/0089237 A1 | 3/2018 | Dunne et al. | |
| 2018/0121414 A1 | 5/2018 | Nanavati | |
| 2018/0136830 A1 | 5/2018 | Kindelsberger | |
| 2018/0137667 A1 | 5/2018 | Kindelsberger | |
| 2018/0144424 A1 | 5/2018 | Sahu | |
| 2018/0157404 A1 | 6/2018 | Noel | |
| 2018/0157761 A1 | 6/2018 | Halstead | |
| 2018/0189416 A1 | 7/2018 | Lee | |
| 2018/0198819 A1 | 7/2018 | Lee | |
| 2018/0239959 A1 | 8/2018 | Bui | |
| 2018/0293330 A1 | 10/2018 | Kovac | |
| 2018/0315228 A1 | 11/2018 | Boettcher | |
| 2018/0367414 A1 | 12/2018 | Raghavendra | |

OTHER PUBLICATIONS

TensorFlow, "TensorBoard: Graph Visuaiization", dated Nov. 2015, https://www.tensorflow.org/versions/r0.11/how_tos/graph_viz/, 10 pages.

Neo4j Data Import: Moving Data from RDBMS to Graph, Tutorial, https://neo4j.com/developer/guide-importing-data-and-etl/, dated Aug. 2016, 9 pages.

Linkurious, A Web-Based Graph Data Visualization Tool for Investigative Journalism, http://www.influencemapping.org/blog/2015/09/30/linkurious.html, 3 pages. Dated Sep. 2015, 3 pages.

Kovalev, Sergey, "Visualizing Tensor How Grpahs with Tensor Board", Blog on All Things Cloud Foundry, https://blog.altoros.com/visualizing-tensorflow-graphs-with-tensorboard.html,dated Apr. 4, 2016, 5pgs.

Kofia, et al., "Social Network: a Cytoscape app for visualizing co-publication networks [version 1; referees: 2 approved with reservations]", dated Aug. 5, 2015, 14 pages.

Influence Mapping Group, "Linkurious, A Web-Based Graph Data Visualization Tool for Invenstigative Journalism", http://www.influencemapping.org/blog/2015/09/30/linkurious.htm, dated Sep. 30, 2015, 3pgs.

Hammant, Paul, "Whats Your Branching Model?", Blog, https://paulhammant.com/2013/12/04/what_is_your_branching_model/, dated Dec. 4, 2013, 4 pages.

Graph Data, "Turi Machine Learning Platform User Guide", Working with Graphs, https://turi.com/learn/userguide/sgraph/sgraph.html, dated Jun. 2016, 1 page.

(56) References Cited

OTHER PUBLICATIONS

Gephi Tutorial Visualization, dated May 26, 2010, 24 pages.
Ganser et al., "Topological Fisheye Views for Visualizing Large Graphs", dated Jul. 2005, 8 pages.
Freeman, Eve, "Getting Sgtarted with Neo4j and Cypher", https://www.airpair.com/neo4j/posts/getting-started-with-neo4j-and-cypherdated Aug. 2016, 12 pages.
Ellson et al., "Graphyiz and Dynagraph-Static and Dynamic Graph Drawing Tools", AT&T Labs—Research, dated 2004, 23 pages.
Kindelsberger, U.S. Appl. No. 15/603,218, filed May 23, 2017, Interview Summary dated Feb. 27, 2019.
Kindelsberger, U.S. Appl. No. 15/469,674, filed Mar. 27, 2017, Interview Summary dated Mar. 20, 2019.
Kindelsberger, U.S. Appl. No. 15/469,674, filed Mar. 27, 2017, Advisory Action dated Apr. 18, 2019.
Djdates, Access 2007 Tutorial, Dated Nov. 15, 2009, YouTube.com, link: https://wwww.youtube.com/watch?v=nszRT3nRUMU, 8 pages.
Kindelsberger, U.S. Appl. No. 15/603,218, filed May 23, 2017, Office Action dated Dec. 14, 2018.
Kindelsberger, U.S. Appl. No. 15/469,674, filed Mar. 27, 2017, Final Office Action dated Jan. 18, 2019.
Kindelsberger, U.S. Appl. No. 15/469,674, filed Mar. 27, 2017, Office Action dated Jun. 13, 2019.
Kindelsberger, U.S. Appl. No. 15/603,218, filed May 23, 2017, Advisory Action dated Aug. 14, 2019.

\* cited by examiner

FIG. 2

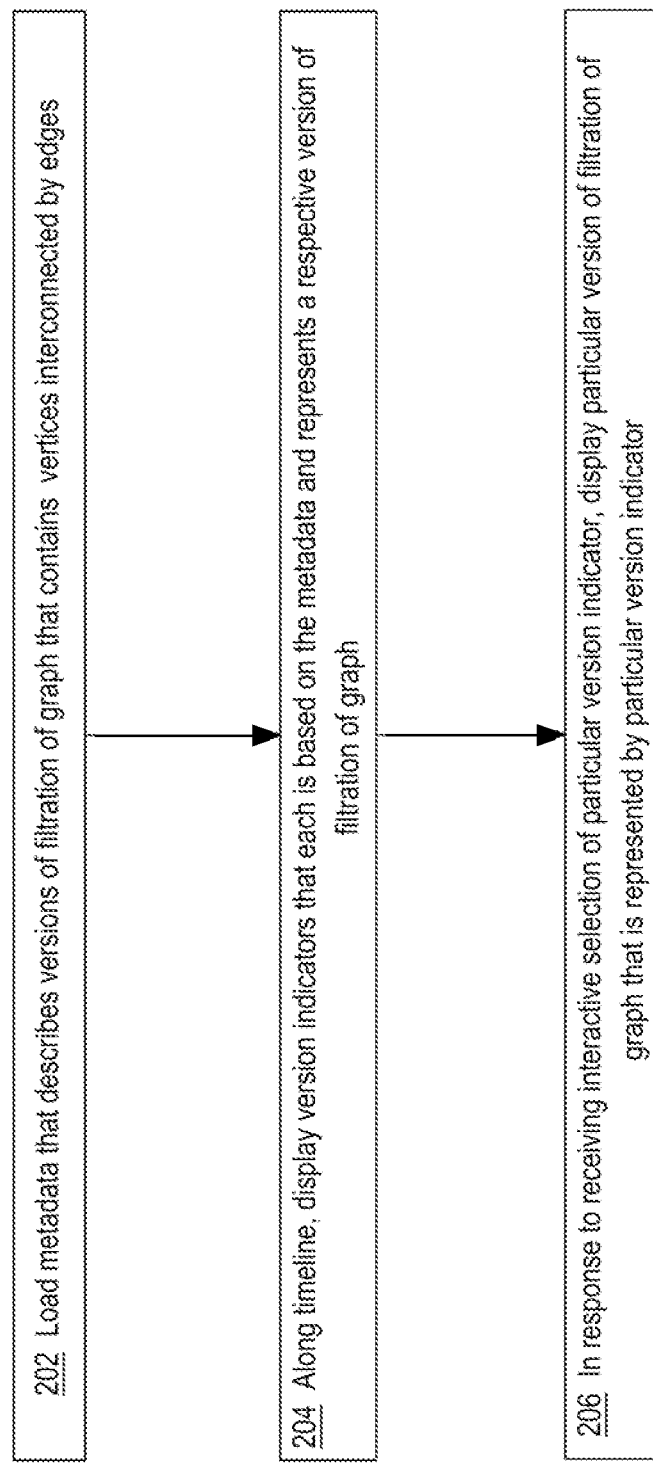

202 Load metadata that describes versions of filtration of graph that contains vertices interconnected by edges 204 Along timeline, display version indicators that each is based on the metadata and represents a respective version of filtration of graph 206 In response to receiving interactive selection of particular version indicator, display particular version of filtration of graph that is represented by particular version indicator

VISUALIZING UI TOOL FOR GRAPH CONSTRUCTION AND EXPLORATION WITH ALTERNATIVE ACTION TIMELINES

FIELD OF THE DISCLOSURE

This disclosure relates to graph drawing. Presented herein are techniques that organize and present as branches the historical versions of filtrations of a property graph in a way that suits interactive exploration.

BACKGROUND

Graph drawing is a convenient and effective tool for visualizing relationship between data entities. By representing data entities as vertices and their fine-grained interconnections as edges, graph visualization provides users a quick and intuitive understanding of the data set. However, the effectiveness of graph visualization degrades as the size of a data set grows when there are too many vertices and edges to clearly visualize.

Once the amount of data becomes larger than some threshold, occlusion and data density become too high for an effective visualization. That is, the vertices and edges overlap extensively and therefore the user is overwhelmed by the volume of information, rather than being given a well-summarized understanding. Consequently, graph visualization has had limited success in visualizing very large data sets.

There have been some approaches to resolve the large graph visualization problem, most prominently pan-and-zoom, clustering/communities, and a hyperbolic fish eye. Pan and zoom is one way the user can explore large graphs, however the user sees just a part of the graph when zooming in, instead of getting an overview of all the information in the graph.

Traditionally, large graph visualization methods focus on visualizing each vertex and edge and may offer techniques to hide parts of the graph or summarize communities based on topology. Communities group vertices of a graph into sets, such that each set is densely connected internally. Each group/set can be visually distinguished (e.g. different color, size, shape), and the vertices that belong to a group can be visualized closer together. In the fish-eye view, the selected area is magnified and the surrounding areas are distorted (shrunk) to remain in view.

However, the best way to highlight interesting parts of a graph may be to hide the uninteresting (noisy) parts. Thus, filtration of vertices and edges is an important way to make graph visualization more meaningful. However, there may be too much or too little filtering, especially because goals of filtration tend to be specific to particular scenarios or analytic or demonstrative contexts. For example, even display screen size can affect how much filtering is optimal. Tuning (adjusting) for optimum filtration may be a manual and tediously iterative process. For example, tuning by trial and error may involve speculative tuning in search of improved filtration, and backtracking (undoing) if filtration does not improve.

Existing tooling lacks a concept of filtration history, which makes backtracking difficult and error prone. Without history and backtracking, there is an unfortunate disincentive against speculative and exploratory tuning of filters, which means that aesthetically optimal or semantically optimal filtration might not be achieved for a given graph.

BRIEF DESCRIPTION OF THE DRAWINGS

In the drawings:

FIG. 2 is a flow diagram that depicts an example process that displays and operates a versioned filtration history of a graph along an interactive timeline, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Computer
   2.1 Property Graph
   2.2 Filtration
   2.3 Filtration History
   2.4 Timeline
   2.5 Interactivity
3.0 Timeline Process
4.0 Versioning
   4.1 Adjustment
   4.2 Version Creation
5.0 Line Graph
   5.1 Dependent Axis
   5.2 Independent Axis
   5.3 Interactivity
6.0 Simplification
   6.1 Summarization
   6.2 Rendering
   6.3 Comparison 7.0 Scalability
   7.1 Client
   7.2 Server
   7.3 Initialization
   7.4 Request
   7.5 Response
   7.6 Simplification Threshold
   7.7 Visual Threshold
   7.8 Thick and Thin Clients
8.0 Branching
9.0 Merging
   9.1 Interactivity
   9.2 Mechanics
   9.3 Direct Manipulation
10.0 Hardware Overview
11.0 Software Overview
12.0 Cloud Computing 1.0 General Overview Techniques are provided for organizing and presenting as branches the historical versions of filtrations of a property graph in a way that suits interactive exploration. In an embodiment, a computer loads metadata that describes versions of filtration of a graph that contains vertices interconnected by edges. Based on the metadata, the computer displays, along a timeline, version indicators that each represents a respective historical version of filtration of the graph. The computer displays, in response to receiving an interactive selection of a particular version indicator of the plurality of version indicators, a particular version of filtration of the graph that is represented by the particular version indicator.

In embodiments, subsequences of versions for the timeline are organized as branches. In embodiments, branches may be merged. In embodiments, branching and merging are interactively controlled.

Described herein are techniques for integrating branching and merging into the general lifecycle of graph filtration. Included are techniques for presenting and operating a version timeline as a tool for historical navigation and speculative exploration. Also described are architectural topologies for shifting performance bottlenecks associated with historical navigation.

2.0 Example Computer

Figure 1:
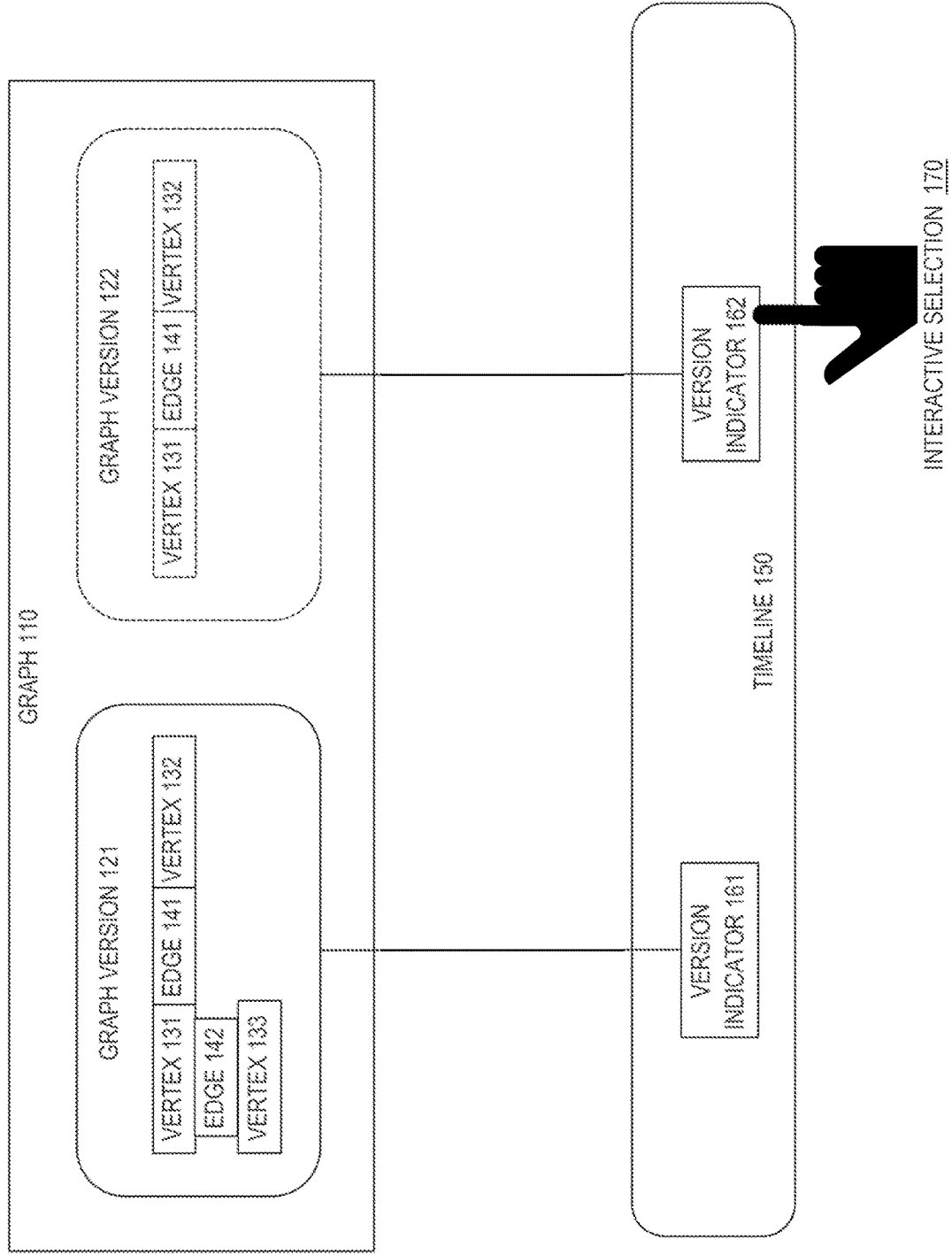
FIG. 1 is a block diagram that depicts an example computer that displays a versioned filtration history of a graph along an interactive timeline, in an embodiment.

FIG. 1 is a block diagram that depicts an example computer 100, in an embodiment. Computer 100 displays a versioned filtration history of a graph along an interactive timeline.

Computer 100 may be a rack server such as a blade, a personal computer, a mainframe, a network appliance, a virtual machine, a smartphone, or other computing device. In embodiments, computer 100 accesses graph 110 that is stored in memory, on disk, or over a network.

2.1 Property Graph

Graph 110 is a logical graph that contains vertices, such as 131-133, that are interconnected by edges, such as 141-142. For example, edge 141 connects vertices 131-132.

Graph 110 (and edges 141-142) may be directed or undirected. Graph 110 may be connected or may contain some disconnected vertices (that lack edges). Although not shown, an edge may originate from and terminate at a same vertex.

Graph 110 may be immense. For example, original graph 110 may contain billions of vertices and trillions of edges. For example, graph 110 may reside on disk (not shown) and be too large to fit into memory.

For example, graph 110 may encode an artificial neural network. However in most cases, the subject matter of graph 110 involves details of real-world (and perhaps familiar) objects. For example, graph 110 may encode a social network.

For example, each of vertices 131-133 may represent a person. Likewise, each of edges 141-142 may represent a relationship, such as a friendship between two people.

2.2 Filtration

Not all of graph 110 need be interesting to a user. For example, most or much of graph 110 may be regarded as noise that is unrelated to a problem at hand for the user.

Thus, an interesting portion of graph 110 may be visually obscured by vertices and edges that are irrelevant to the problem at hand. For example, graph 110 may represent a social network of thousands of people across a country. Whereas, the user might only be interested in people that live within a particular postal zip code.

Thus filtering of contextually uninteresting vertices and/or edges during display of graph 110 by computer 100 may improve usability. However, optimal filtering may depend on several variables.

For example, an analytical rationale of a contextual scenario may determine which vertices and edges are interesting or uninteresting. For example, which zip codes are interesting in a marketing graph may vary according to season or other context.

Optimal filtering may depend on display screen real estate. For example, a user may want to see as many vertices and edges as can be displayed without visual overlap.

Interactively achieving optimal filtering may entail exploratory (trial and error) adjustment of filtration. For example, the user may iteratively add filters to reduce visual clutter, which may eventually cause excessive filtration that hides interesting vertices or edges.

2.3 Filtration History

Thus, exploratory filtering may benefit from an ability to undo excessive filtration and restore a prior filtration from a history of filtrations. Filter history may also assist with intentionally comparative filtration, such as trend analysis and variant analysis.

The history of filtrations for graph 110 comprises graph versions, such as 121-122, that each applies distinct filtration to the same underlying (original) graph 110. For example, graph version 121 may be unfiltered. Whereas for example, graph version 122 may be filtered to include only vertices that represent people that reside in particular zip codes.

2.4 Timeline

Computer 100 may display filtration history for graph 110 in visual timeline 150, based on metadata that describes the filtration history. Timeline 150 may be rendered as a ruler or other gauge whose divisions represent timestamps or filtration versions or both.

For example, version indicators 161-162 visually represent respective graph versions 121-122. In embodiments, the amount of visual horizontal space between version indicators 161-162 may proportionally represent: a) temporal separation as an amount of time that elapsed between the creation of graph versions 121-122, or b) logical separation as an amount of versions that were created between the creation of graph versions 121-122.

2.5 Interactivity

Timeline 150 may have a scrollbar to accommodate more version indicators than can fit within the screen real estate that is reserved for timeline 150. Thus, timeline 150 may be interactive.

Version indicators 161-162 may also be interactive. For example, interactive selection 170 may occur when a finger, pointing device, or other interactivity selects version indicator 162.

For example, the display screen of computer 100 may initially show graph version 121 but not 122. Thus, graph version 122 and its vertices and edges are drawn with dashed lines to demonstrate that they are not initially displayed.

Interactive selection 170 may halt display of graph version 121 and instead cause display of graph version 122. Thus, the user may arbitrarily browse different graph versions to see the effects of different filtrations for a same underlying graph 110.

3.0 Timeline Process

FIG. 2 is a flow diagram that depicts an example process that displays and operates a versioned filtration history of a graph along an interactive timeline, in an embodiment. FIG. 2 is discussed with reference to FIG. 1.

Step 202 is preparatory. Step 202 loads metadata that describes versions of filtration of a graph that contains vertices interconnected by edges.

For example, filtration history may be stored in durable or volatile storage by computer 100 as graph versions and respective descriptive metadata. For example, computer 100 may store graphs in a graph database and metadata that describes versions of those graphs in a relational database.

For example, the metadata for a graph version may 1) identify the original graph, 2) identify the graph version, 3) specify filter criteria that produced the graph version, and 4) timestamp when the graph version was created. The metadata may additionally identify from which prior graph version was this graph version created.

The metadata may also contain branch information. Branching is discussed elsewhere below.

Steps 204 may more or less immediately follow step 202. In step 204, version indicators are displayed along a timeline, such that each version indicator is based on the metadata and represents a respective version of filtration of the graph. For example, computer 100 may analyze the metadata that was loaded in step 202 to determine a sequence of graph versions that represent different historical filtrations of an original graph.

Based on that metadata analysis, computer 100 may generate version indicators 161-162 for respective graph versions 121-122. Computer 100 may render version indicators 161-162 along timeline 150.

Step 206 does not occur until a user interactively selects a version indicator. Thus, an arbitrary delay may separate steps 204 and 206.

Step 206 is responsive to receiving an interactive selection of a particular version indicator. For example, the user may click on the particular version indicator. For example, interactive selection 170 may represent a mouse click upon version indicator 162.

In step 206, a particular version of filtration of the graph that is represented by the particular version indicator is displayed. For example, computer 100 displays graph version 122 because version indicator 162 was selected.

For example, computer 100 may apply the filter criteria for graph version 122 to original graph 110 to create or regenerate graph version 122. Computer 100 may then render graph version 122 onto a display screen of computer 100.

4.0 Versioning

Figure 3:
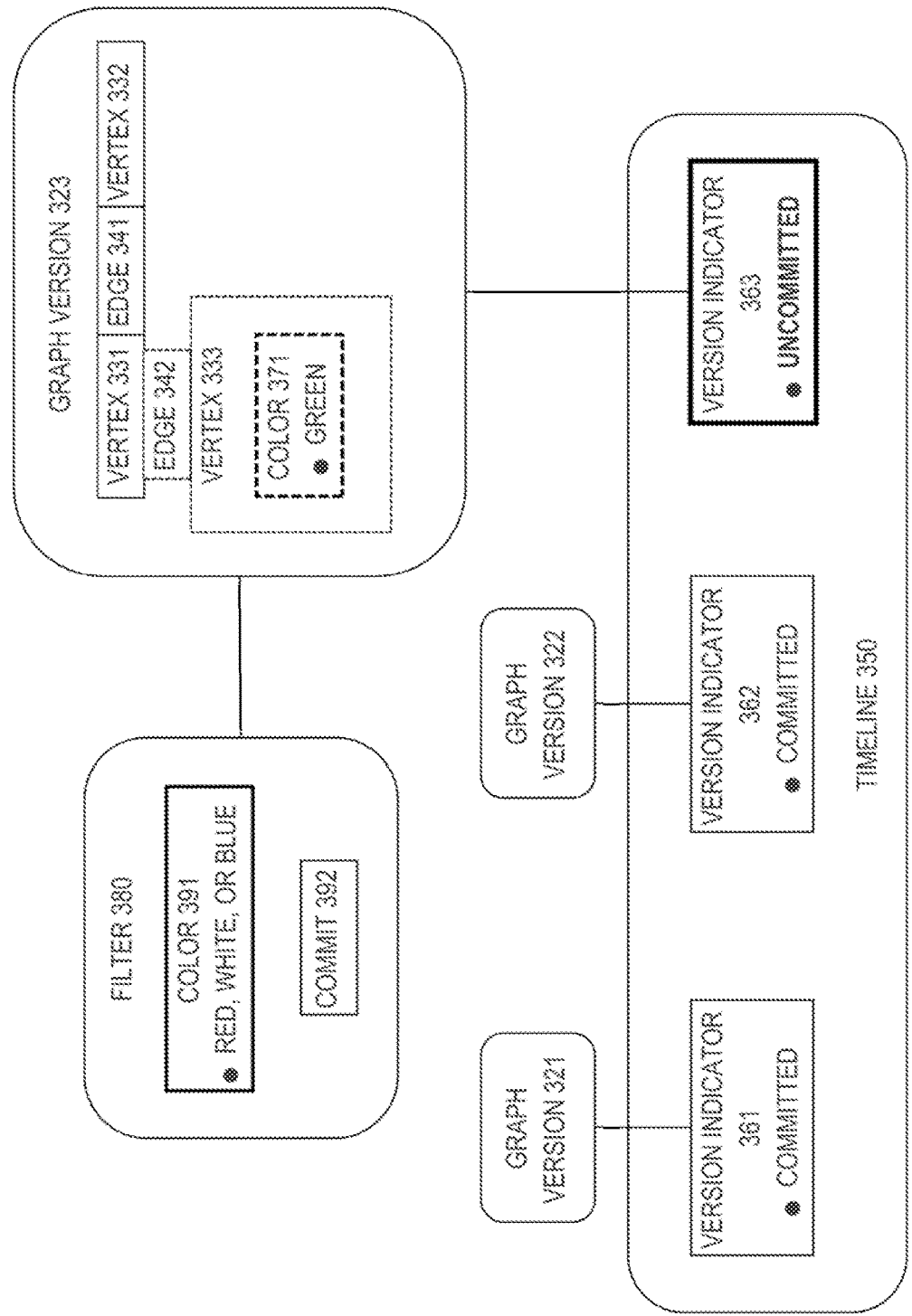
FIG. 3 is a block diagram that depicts an example computer that tracks historical graph versions that are committed and a current graph version that is uncommitted (not yet committed), in an embodiment.

FIG. 3 is a block diagram that depicts example computer 300 that tracks historical graph versions that are committed and a current graph version that is uncommitted (not yet committed), in an embodiment. For example, filtration of an uncommitted graph version may evolve. Thus, which vertices and edges are included in the uncommitted version may change.

Computer 300 may access an original graph (not shown) that has historical graph versions 321-322 and current graph version 323. Within timeline 350 are displayed version indicators 361-363 that respectively represent graph versions 321-323.

Version indicators 361-362 are visually marked as committed to indicate that they represent historical graph versions 321-322 that the user accepted as noteworthy or that computer 300 otherwise detected as worthy of saving. Whereas, version indicator 363 is visually marked as uncommitted to indicate that filtration of current graph version 323 may still evolve, such as by adding, removing, or adjusting filter criteria for graph version 323.

4.1 Adjustment

Computer 300 may display interactively adjustable filtration criteria such as filter 380 that is associated with a particular graph version, such as 323. For example, vertices 331-333 may have a color property, such as 371, that may be used for filtration.

For example, filter 380 specifies color 391 that configures graph version 323 to include only vertices whose color is red, white, or blue. Thus, filter 380 excludes vertex 333 from graph version 323 because vertex 333 is colored green, which is not red, white, or blue.

Thus, vertex 333 is drawn (for demonstration) with dashed lines to indicate that vertex 333 is filtered away (hidden) by filter 390. Hiding vertex 333 may automatically cause hiding of its edges, such as 342.

Computer 300 may present filter 380 to the user by displaying a visual panel, such as a dialog box, pop-up, or other window. Filter 380 and color 391 may be interactive.

For example, computer 300 may display a bank of checkboxes for available respective colors, and the user may interactively set or clear individual checkboxes to filter or not filter vertices of the colors whose checkboxes are checked. For example, interactively clearing a green checkbox may cause green vertices (e.g. 333) to become hidden, more or less immediately.

4.2 Version Creation

For example, filter 380 may include a pushbutton (not shown) that when pressed causes the display of graph version 323 to be updated to reflect the current state of the checkboxes. Filter 380 also has commit 392 that may be a pushbutton or other interactive widget.

Pushing commit 392 may cause graph version 323 and graph version indicator 363 to change from uncommitted to committed. Further filtration changes made after committing may cause creation of a new graph version (not shown).

5.0 Line Graph

Figure 4:
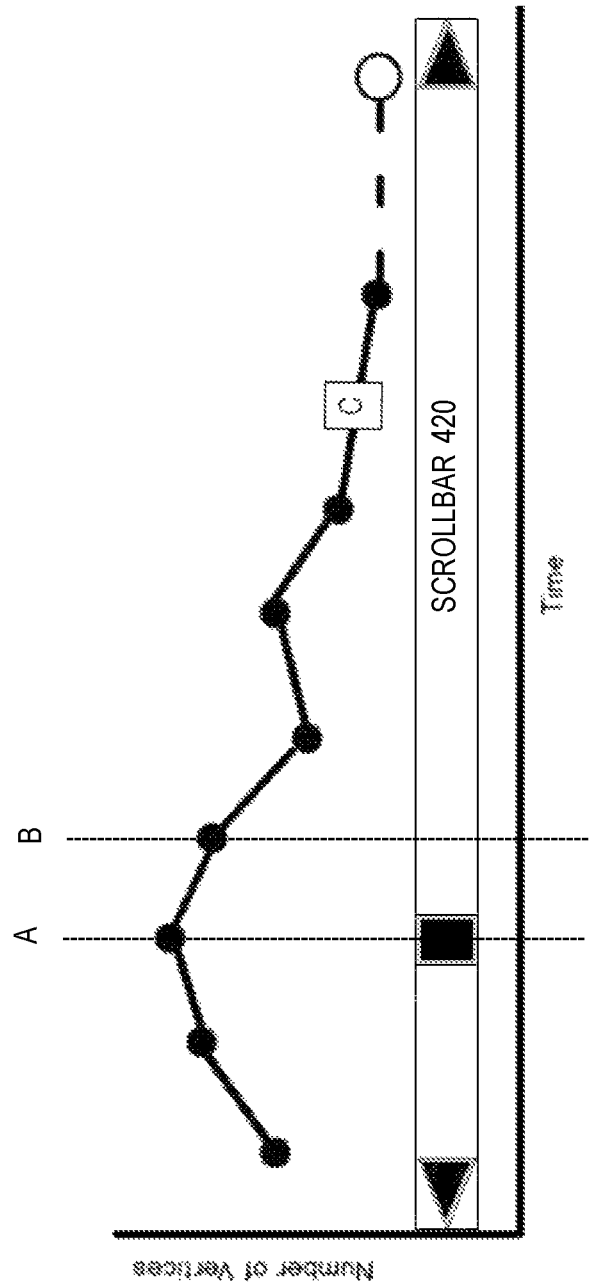
FIG. 4 is a screen snapshot of an example computer display that depicts a version timeline as scrollable line graph, in an embodiment.

FIG. 4 is a screen snapshot of example computer display 400 that depicts a version timeline as scrollable line graph, in an embodiment. Thus, the timeline may have more version indicators than can fit within available screen real estate.

Display 400 displays line graph C. Time is the horizontal (independent) axis of line graph C.

Each point on line graph C is a version indicator. The vertical position of a version indicator represents how many vertices of an original graph (not shown) satisfy the filtration criteria for the version indicator.

5.1 Dependent Axis

Thus, vertex count is the vertical (dependent) axis of line graph C. In embodiments, the vertical axis counts vertices, edges, or vertices and edges that satisfy filtration.

If there are too many version indicators to visually fit within display 400, then scrollbar 420 provides interactive scrolling. Scrollbar 420 has a thumb (scrubber) that may be interactively dragged within scrollbar 420.

5.2 Independent Axis

The horizontal position of the thumb indicates which version indicator is active (selected) and which corresponding graph version (not shown) is currently rendered within display 400. Shown for demonstrative purposes, dashed vertical line A reveals which version indicator (dot) of line graph C is selected and aligned with the thumb.

5.3 Interactivity

There may be multiple ways to select a version indicator. For example, moving the thumb to dashed (demonstrative) line B may cause a next version indicator to be selected. Instead of manually moving the thumb, clicking the version indicator (dot) of dashed line B causes 1) that version indicator to be selected, and 2) the thumb to automatically move to dashed line B.

In either case and although not shown, changing which version indicator is selected causes whichever graph version is currently rendered to be visually replaced by rendering of another graph version. Thus, the user has random access to graph versions.

Likewise, the thumb automatically shifts through a sequence of multiple adjacent versions while scrolling is continuously engaged (by depressing a black triangle of scrollbar 420). Thus evolving filtration may be visually animated as a rendered sequence of graph versions (not shown).

In embodiments, at the right end of line graph C is a white dot that may designate that the rightmost version indicator corresponds to a graph version that is uncommitted and/or currently selected. In embodiments, the dashed segment along line graph C that reaches the white dot may designate that the graph version for the rightmost version indicator is uncommitted.

6.0 Simplification

Figure 5:
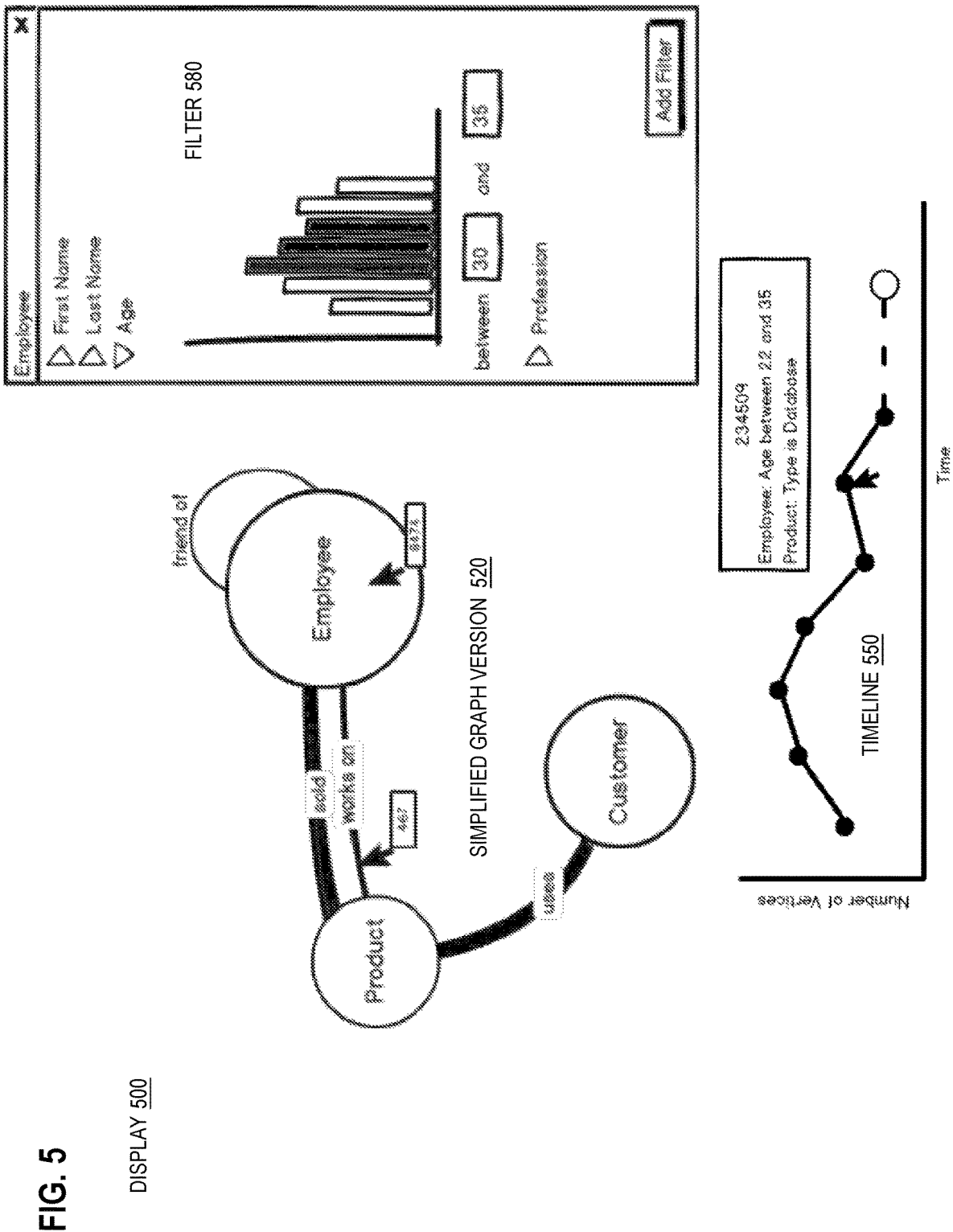
FIG. 5 is a screen snapshot that depicts an example computer display that uses 1) graph simplification to depict an overcomplicated graph version, and 2) gestures to explain simplifications, in an embodiment.

FIG. 5 is a screen snapshot of example computer display 500 that uses 1) graph simplification to depict an overcomplicated graph version, and 2) gestures to explain simplifications, in an embodiment. Graph simplification entails combining similar vertices or edges into a single rendered vertex or edge.

Display 500 includes timeline 550. Dots along timeline 550 are version indicators.

This implementation is hosted by a computer that has an interactive pointing device such as a mouse. The mouse moves a cursor, shown as a black arrow on timeline 550.

6.1 Summarization

The cursor may stall (hover) on a version indicator to cause a version summary to be displayed in a popup or tooltip. The version summary may show basic statistics of a graph version that corresponds to the version indicator.

In this example as shown, the version summary is a rectangle that enumerates filter criteria and tallies vertices that satisfy the criteria. For example, the version summary includes two filter criteria.

The first filter criterion matches employee vertices that have an age property whose value falls within the shown range. The second filter criteria matches product vertices that are databases (according to a type property of the vertices). The version summary also reports how many vertices and edges satisfy the filter critieria, which in this example is 234,509 vertices and edges.

6.2 Rendering

Clicking on a version indicator of timeline 550 causes a respective graph version to be displayed, such as 520. Graph version 520 has too many vertices to meaningfully visualize.

Thus graph version 520 is automatically simplified, such that vertices of a same type or category are combined into a single rendered vertex. For example, graph version 520 may contain hundreds or thousands of employee vertices, customer vertices, and product vertices that satisfy the filtration of graph version 520.

However, simplification causes rendering of a single employee vertex to represent all employee vertices that satisfied the filtration. Likewise, product and customer show only as simplified vertices.

The diameter of a simplified vertex may indicate how many original vertices are represented by the simplified vertex. For example, the employee vertex is bigger than the product vertex because there are more employees than products that satisfy filtration in graph version 520.

In this example, the version summary does not include filter criteria for customer vertices. Thus by default, the simplified customer vertex represents all customers of the original graph.

When the cursor hovers over a simplified vertex, a tooltip may show a tally of how many original vertices are represented by the simplified vertex. For example, a tooltip shows that the employee vertex aggregates 8,474 employees.

Likewise, edges may be simplified. The more original edges that a simplified edge represents, the thicker is the simplified edge rendered.

For example, the sold edge is thicker than the works-on edge because the filtered employees sold more filtered products than the filtered employees worked on. Hovering over the works-on edge shows a tooltip that reports that 467 filtered products were worked on by the filtered employees, or more accurately, that there are 467 works-on pairings of filtered employees to filtered products.

6.3 Comparison

Although not immediately apparent in FIG. 5, the version summary (and corresponding version indicator dot) on timeline 550 may be for a different graph version than the currently shown graph version 520. For example, graph version 520 may correspond to the white version indicator at the right end of timeline 550.

Whereas, the cursor may hover over any other version indicator to trigger a tooltip without disturbing the already rendered graph version 520. Thus, the user may view summaries of other graph versions for a statistical comparison to the currently rendered graph version 520.

The user may click on the employee vertex to cause filter 580 to appear or update. Filter 580 may be a modal or modeless dialog or a docked (anchored) panel.

Filter 580 lists employee properties with a triangle beside each property. A triangle pointing sideways (e.g. first name property) is collapsed and shows little or no detail.

These triangles are interactive toggles. Clicking toggles a triangle between collapsed (pointing sideways) and expanded (pointing down, e.g. age property).

An expanded property may show additional details or statistics of the property, including current filtration. For example, age is currently filtered on a range of 30-35 years old.

The histogram tallies employees by age bands (histogram bars). Age bars that satisfy the filter are drawn black. Age bars that do not satisfy the filter are drawn white.

Filter 580 may have pushbuttons or other widgets to add (shown), remove, or adjust filters. Filter 580 may have a pushbutton (not shown) to commit the current graph version.

7.0 Scalability

Figure 6:
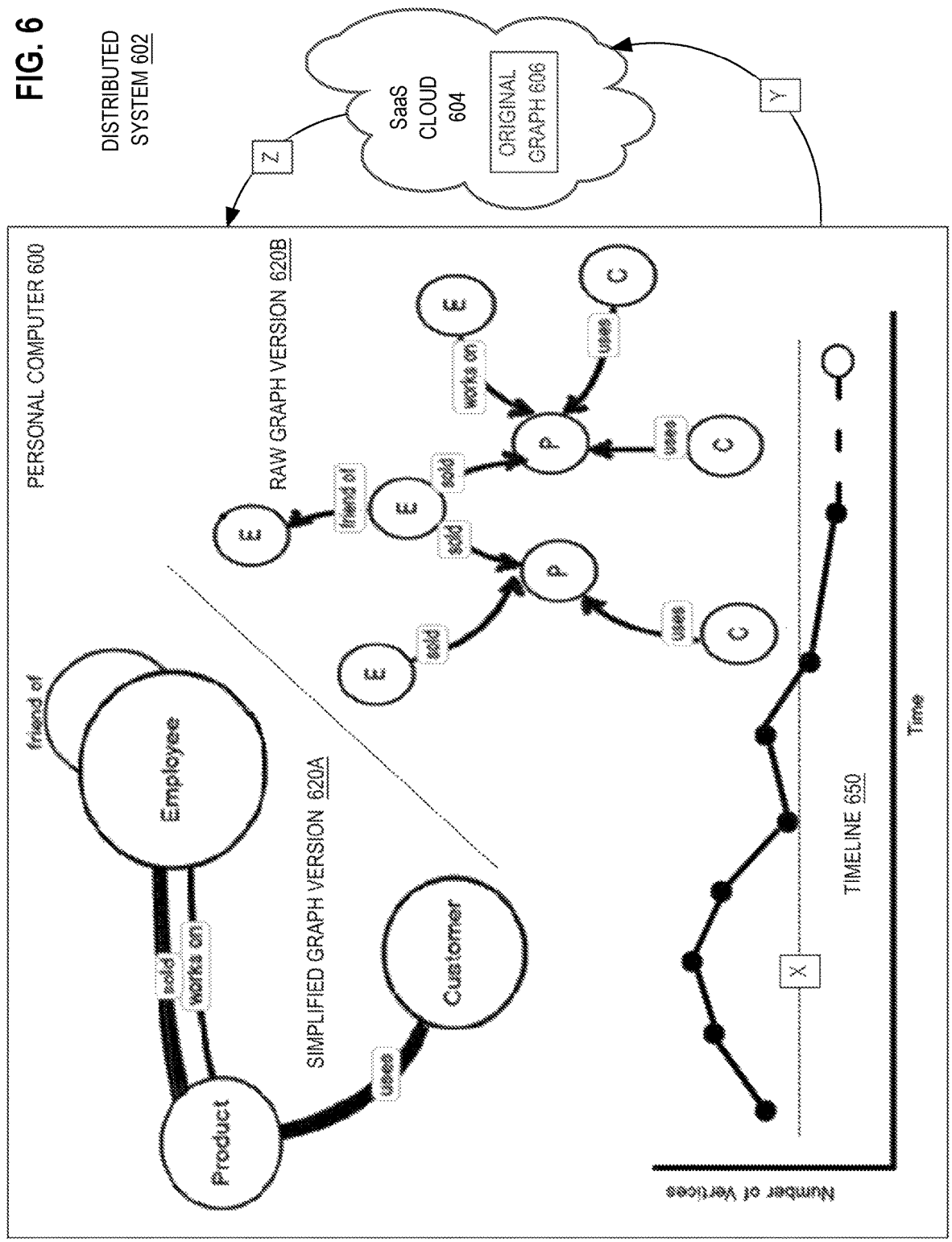
FIG. 6 is a block diagram that depicts an example distributed system 602 that 1) keeps an original graph on a backend, and 2) renders a simplified graph on a frontend, in an embodiment.

FIG. 6 depicts example distributed system 602 that 1) keeps an original graph on a backend, and 2) renders a simplified graph on a frontend, in an embodiment. Thus, distributed system 602 has a client/server architecture that may either conserve network bandwidth or conserve client processor bandwidth.

7.1 Client

Distributed system 602 includes personal computer 600 that operates as a client, and software as a service (SaaS) cloud 604 that operates as a server. Personal computer 600 and SaaS cloud 604 are connected by a computer network (not shown) such as a local area network (LAN) or an internetwork such as the global internet.

Personal computer 600 may be a laptop, a smartphone, or other computer that has a display screen. In embodiments, personal computer may be a dumb terminal, a remote desktop, a web browser, or other thin client.

However as explained below, a thick client needs less network bandwidth and more processor bandwidth. Thus, different implementations may make different tradeoffs between network and processor demand.

7.2 Server

SaaS cloud 604 may be a single server computer or an aggregation of computers such as a cluster, a data center, a computational cloud, or other hosting platform. If SaaS cloud 604 is a virtual machine, then SaaS cloud 604 may actually be (not shown) hosted by (contained in) personal computer 600.

SaaS cloud 604 may have durable bulk storage (e.g. disks) that stores many huge original graphs, such as 606. Whereas, personal computer 600 need not have storage capacity for an original graph. Indeed for performance or security, original graph 606 need never leave SaaS cloud 604.

7.3 Initialization

Personal computer 600 may host a graph studio application that initially logs into SaaS cloud 604 to retrieve a metadata catalog of graph versions for a particular original graph, such as 606. The metadata catalog enumerates summaries of graph versions that include statistics such as creation time and how many vertices satisfy the filtration.

Upon retrieval of the metadata catalog from SaaS cloud 604, personal computer 600 may initially render timeline 650. To view a graph version, a user may interactively select a version indicator (dot) on timeline 650.

7.4 Request

Personal computer 600 communicates the selection of a version indicator to SaaS cloud 604, shown as arrow Y. For example, Y may be a message or remote procedure call that bears an identifier of a selected graph version (of a given original graph such as 606).

7.5 Response

SaaS cloud 604 reacts to message Y by 1) retrieving (e.g. from a database) filter criteria for the identified graph version, 2) applying the filter criteria to the corresponding original graph such as 606 to select a matching set of vertices and edges of original graph 606 that satisfy the filtration, 3) detect whether or not the matching set is too big to be meaningfully visualized, and 4) based on the detecting, sending (shown as arrow Z) a raw or a simplified (as described for FIG. 3) copy of the matching set of vertices and edges.

For example if the matching set has too many vertices and edges, then SaaS cloud 604 sends simplified graph version 620A. Whereas if the matching set is small enough, then SaaS cloud 604 sends raw graph version 620B.

Thus, graph versions 620A-B represent a same graph version having a same filtration and a same matching set of vertices and edges. The difference is that each vertex or edge of raw graph version 620B represents an individual vertex or edge.

7.6 Simplification Threshold

Whereas, each vertex or edge of simplified graph version 620A represents multiple vertices or edges of original graph 606. To detect whether the matching set of vertices and edges is too big, SaaS cloud 604 compares the size of the matching set to a threshold.

In embodiments, personal computer 600 provides the threshold. In embodiments, the user may interactively adjust the threshold. In embodiments, the threshold is communicated in message Y.

Personal computer 600 un-marshals and displays whichever of graph version 620A-B was serialized in message Z. Because graph versions are filtered and optionally simplified, serialized graph versions consume less storage than original graph 606. Thus, personal computer 600 may cache multiple graph versions to avoid repeated roundtrip retrievals (messages Y and Z) from SaaS cloud 604.

In embodiments, SaaS cloud 604 provides the threshold for detecting whether or not graph simplification is necessary. In embodiments, the threshold is communicated in the metadata catalog discussed above.

7.7 Visual Threshold

No matter how personal computer 600 obtains the threshold, personal computer 600 may render the threshold as dashed horizontal line X on timeline 605. Version indicators (dots) that appear on the line graph above line X represent graph versions that are too big and thus are simplified.

Whereas, version indicators that appear below line X represent graph versions that are small and are raw (not simplified). Thus, a user may see how far above line X is a version indicator to decide how aggressive should additional filtration be to achieve a graph version that is small enough to be shown raw (without simplification). Thus, the user may intuitively sense progress toward achieving a raw rendering as filtration evolves (increases).

7.8 Thick and Thin Clients

As mentioned above, there may be a performance tradeoff between personal computer 600 operating as a thin client or a thick client. For a thick client, message Z is smaller and serializes a logical encoding of a graph version.

That encoding is logical because it is not an actual rendering of the graph version. Thus, the thick client must render (generate a visual representation) the graph version based on the logical encoding. Thick clientele are more scalable, because 1) less processing is needed at SaaS 604 that is less likely to become a central bottleneck, 2) message Z is small which reduces network congestion, and 3) more thick clients means more computers with which to achieve linear scaling.

Whereas for a thin client, SaaS cloud 604 renders the graph version into message Z, such as with HTML or scalable vector graphics (SVG). Thus, message Z is bigger because visualization encoding is sparse (uses more data than a logical encoding).

As a zero administration client (ZAC), a web browser may operate as a thin client or a thick client. As a thick client, a web browser may need a plugin, an applet, or complicated scripting such as asynchronous JavaScript and XML (AJAX).

In some browser-based thick client embodiments, the graph version is logically encoded within message Z as extensible markup language (XML). The XML graph version, the cascading style sheets (CSS) and extensible stylesheet language (XSL) stylesheets, and JavaScripts may be kept in the web browser's cache. The scripts and stylesheets may be reused from cache for different graph versions and different original graphs.

As a thin client, hypertext markup language version 5 (HTML5) multimedia tags may be sufficient for a web browser. A processor constrained device, such as a residential appliance such as a smart television or set top box, may be better suited as a thin client. A network constrained (e.g. cellular) device, such as an automobile or a roaming smartphone, may be better suited as a thick client.

8.0 Branching

Figure 7:
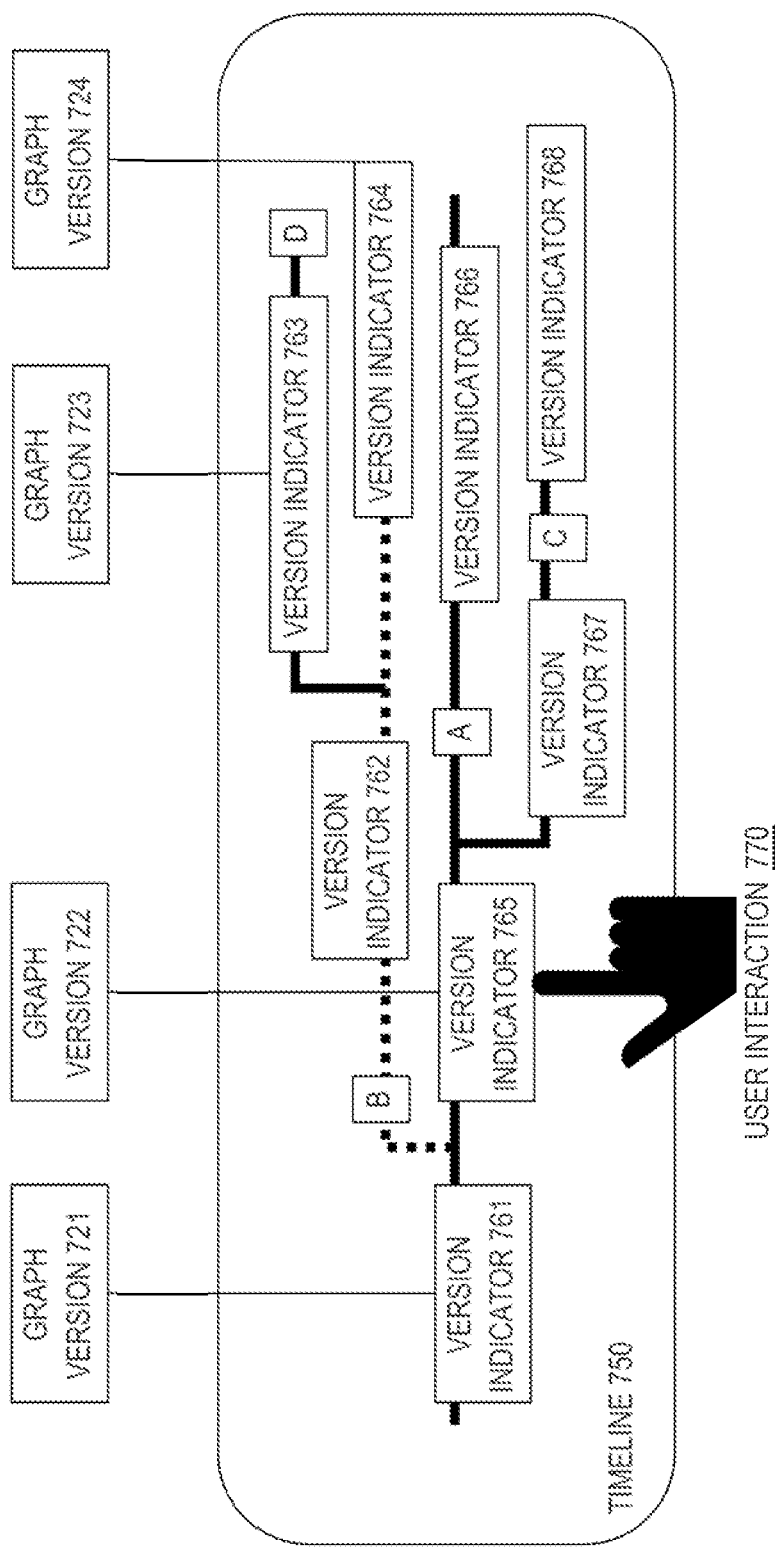
FIG. 7 is a block diagram that depicts an example computer that organizes graph versions into branches, in an embodiment.

FIG. 7 is a block diagram that depicts example computer that organizes graph versions into branches, in an embodiment. For example, historical filtration may pose alternatives that need not be sequentially derived from each other.

Filter criteria may be complex. For example, vertices may be filtered based on vertex properties, and edges may be filtered based on edge properties.

Filtration may entail multiple properties. Filtration of one property may entail multiple values, such as a numeric range or multiple constants.

Thus, filtration may be multidimensional. That is, interactive filtration may explore a multidimensional space.

Interactive exploration may entail alternatives, speculation, and backtracking. Visually representing graph versions as a single linear sequence may be confusing or awkward, especially because a linear sequence will not reveal the breadth of actual exploration.

For example, the user may intend exploration to yield multiple alternative filtration solutions (configurations). Whereas, a single linear sequence may unintentionally suggest evolution toward a single solution.

As a consumer analytics example, consumer purchasing may be dominated by different demographics in different geographic regions. For example, workers may outspend others in Oregon. Whereas, retirees may outspend others in Florida.

Thus, demographic filtration needed for Oregon may be different from what is needed for Florida. Thus, the filtrations for Oregon and Florida may evolve (be adjusted/tuned) as separate sequences of graph versions, shown as branches A-D.

For example, branch D has version indicator 763 and graph version 723. Whereas, branch A has version indicators 761 and 765-766 and respective graph versions (including at least 721-722 as shown).

Initially, only branch A may exist. For example, branch A may be filtered to include national demographics.

Eventually the user may realize that Florida has demographics that are distinct from national demographics. The user may then want to explore separate filtrations for Florida and the rest of the nation.

Thus, the user may intend two separately evolving filtrations for a same original graph (not shown). Thus, the user may create branch B (drawn dashed) for Florida.

Computer 700 may reserve a gesture or other interaction for triggering creation of a branch. For example, user interaction 770 upon version indicator 765 may create branch C off of branch A. The initial filtration for branch C is based on graph version 722.

In embodiments, user interaction 770 entails interactive selection of version indicator 765 to trigger a popup context menu that includes an offer (menu item) to create a branch based on graph version 722. After creating branch C, the user may adjust the filtration of branch C to create a new graph version (not shown) that is represented by version indicator 767.

A hierarchy of branches may arise. For example, branch D is created from branch B, which is created from branch A. For example, 1) branch A may be national; 2) branch B may be Floridian; and 3) branch D may be Floridian retiree.

9.0 Merging

Figure 8:
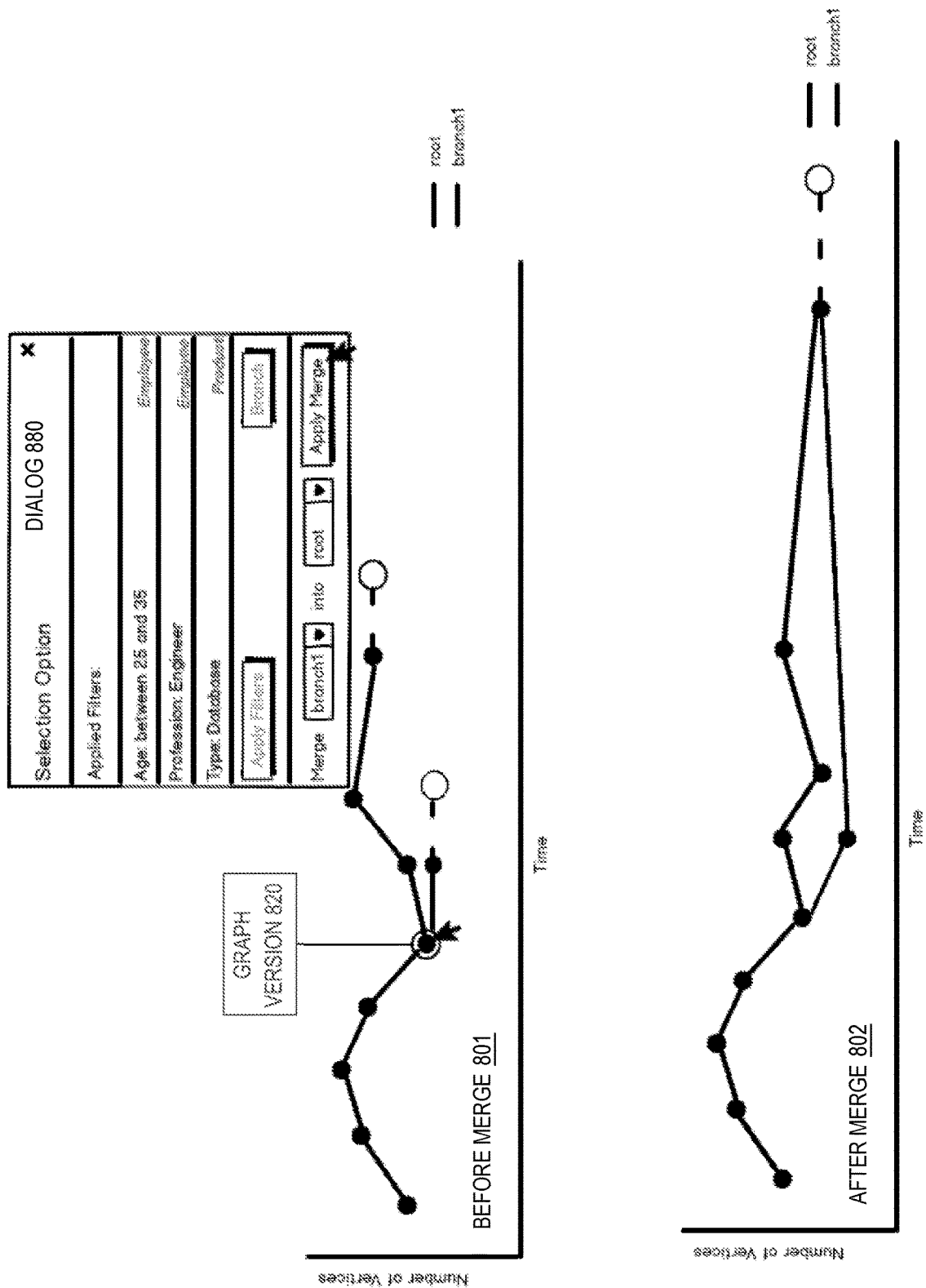
FIG. 8 is a block diagram that depicts an example timeline that merges branches, in an embodiment.

FIG. 8 is a block diagram that depicts an example timeline that merges branches, in an embodiment. For example, uninteresting branches can be ignored, and insightful branches can be merged (combined) to improve an existing branch or synthesize a new branch.

FIG. 8 shows timelines 801-802 that may represent different stages in the development of a same timeline. Before merge 801 shows a timeline that branched at a version indicator that is shown as a dot within a circle for graph version 820.

9.1 Interactivity

The mouse cursor is positioned on that version indicator, as shown by a black arrow. A right-click of the mouse upon that version indicator may cause dialog 880 to appear, which may be a modal or modeless dialog, a popup such as a context menu, or a docked panel.

Dialog 880 enumerates filter criteria for graph version 820. Pressing the branch button on dialog 880 may create a branch based on graph version 820.

The bottom row of dialog 880 is dedicated to merging branches. For example, the timeline has a branch1 branch that forked (was created) from a root branch at graph version 820.

Merging is directional. That is, a source branch is merged into a target branch.

The bottom row of dialog 880 has a pair of combo-boxes that show that branch1 can be merged into the root branch. If a different merge is intended, then the combo-boxes may be interactively adjusted to specify merging of other branches or those same branches in the opposite direction.

Merging visually causes the tips (rightmost version indicators, shown as white circles) of the two branches (shown in before merge 801) to join to form a new tip (and a new graph version, not shown) on the target branch, shown as the white circle in after merge 802.

9.2 Mechanics

Visually the merge may be straightforward. However, logically merging the filters of the two branches may be complicated.

In embodiments, filter merging uses Bayesian set operators. In embodiments, a merge entails a disjunctive union of filters of both branches. For example, merging a day-filtered branch with a night-filtered branch creates an effectively unfiltered branch having all of the vertices from around the clock.

In embodiments, a merge entails a conjunctive intersection of filters of both branches. For example, merging a day branch with a night branch creates an effectively empty branch because night and day are mutually exclusive (do not intersect).

In embodiments, the user selects a Bayesian operator for each property or each filter criterion. No matter what are the merge mechanics, the result is a new graph version on the target branch and a new (merged) set of filter criteria for the new graph version.

9.3 Direct Manipulation

In direct manipulation embodiments, the user may drag any version indicator of a source branch and drop it onto any version indicator of a target branch. If the target version indicator is the tip of the target branch, then the merge occurs as explained for after merge 802. However if the target version indicator is not the tip of the target branch, then the merge creates a new branch (not shown) that originates (forks) at the target version indicator.

10.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
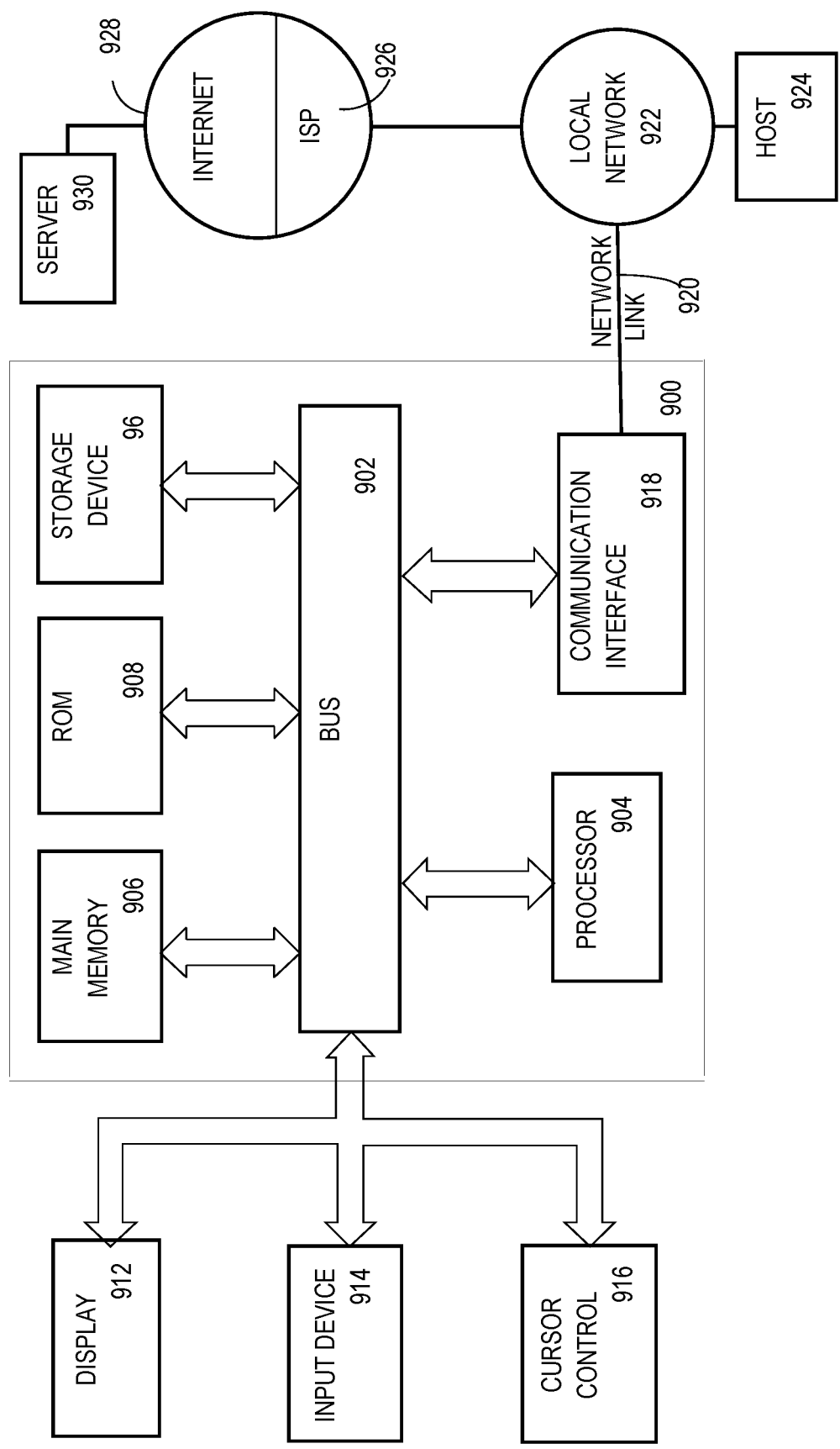
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 96, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 96. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 96. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 96 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 96, or other non-volatile storage for later execution.

11.0 Software Overview

Figure 10:
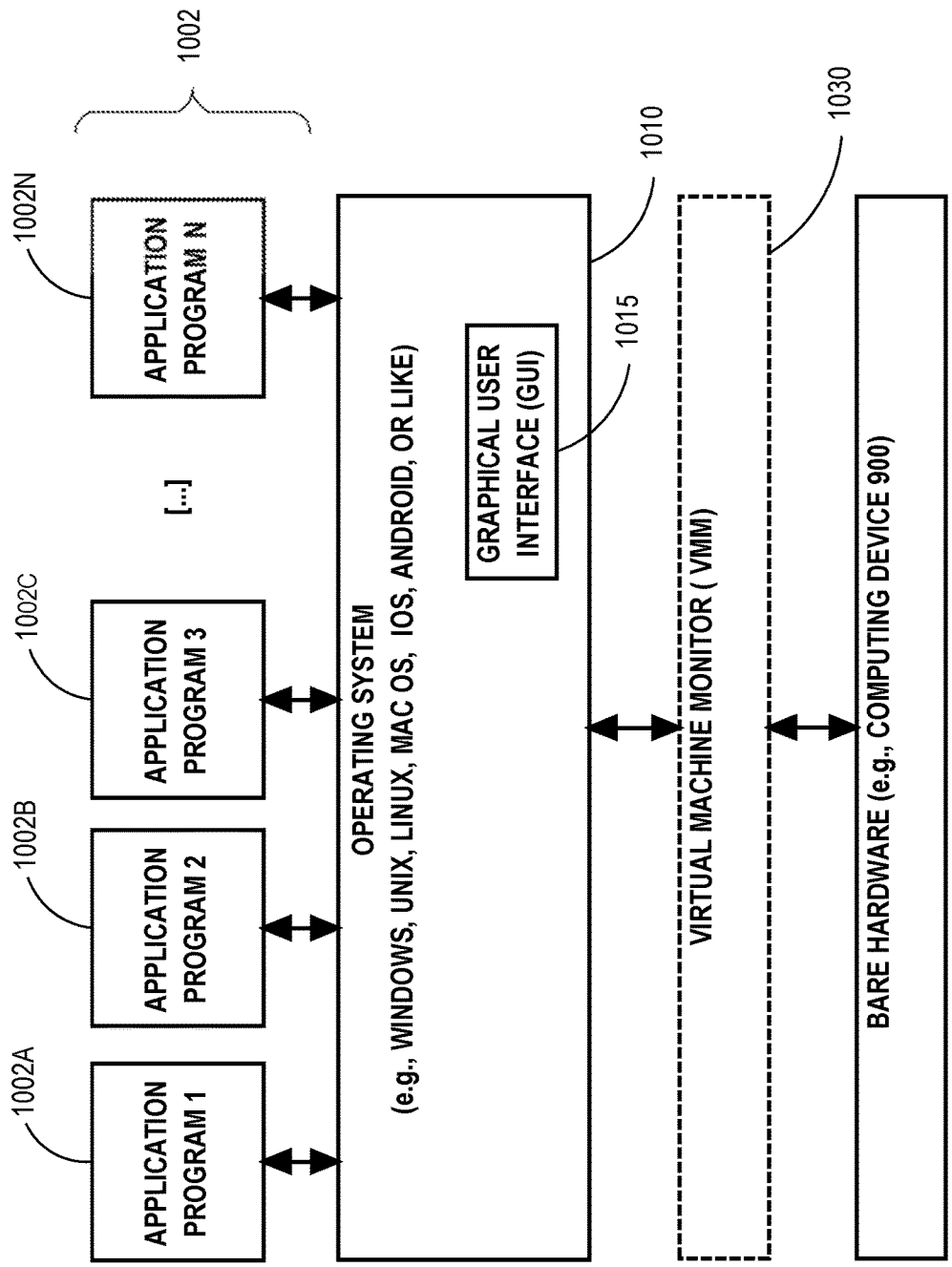
FIG. 10 is block diagram that illustrates a software system upon which an embodiment of the invention may be implemented.

FIG. 10 is a block diagram of a basic software system 1000 that may be employed for controlling the operation of computing system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computing system 900. Software system 1000, which may be stored in system memory (RAM) 106 and on fixed storage (e.g., hard disk or flash memory) 110, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 110 into memory 106) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 104) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 900 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

12.0 Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/ private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
loading metadata that describes a plurality of versions of filtration of a graph that contains a plurality of elements that includes vertices interconnected by edges;
displaying, along a first branch line, a first subset of a plurality of version indicators, wherein each version indicator of the plurality of version indicators is based on the metadata and represents a respective version of a first subset of the plurality of versions of filtration of the graph;
concurrently displaying, along a same timeline, the first branch line and a second branch line, wherein the second branch line originates from a version indicator of the first subset;
displaying, along the second branch line, a second subset of the plurality of version indicators that represents a second subset of the plurality of versions;
displaying, in response to receiving an interactive selection of a particular version indicator of the plurality of version indicators, a particular version of filtration of the graph that is represented by the particular version indicator.

2. The method of claim 1 wherein:
each element of the plurality of elements contains one or more properties, and
the method further comprises modifying, in response to receiving an interactive entry of a filter based on one or more properties, a current version of filtration of the graph based on applying the filter to the one or more properties of the elements of the plurality of elements.

3. The method of claim 2 wherein a version indicator that represents the current version indicates that the current version is not committed.

4. The method of claim 1 wherein:
the first subset of the plurality of version indicators represent a subset of versions of the plurality of versions;
said version indicator of the first subset represents a version that is not a latest version in said subset of versions.

5. The method of claim 1 further comprising:
creating, in response to a user interaction, a new version of filtration of the graph;
displaying a version indicator that represents the new version upon a new branch line.

6. The method of claim 5 wherein:
the first subset of the plurality of version indicators represent a first subset of versions of the plurality of versions;
the second subset of the plurality of version indicators represent a second subset of versions of the plurality of versions;
each of the first subset and the second subset of versions has a respective latest version that contains a respective set of filters;
the user interaction comprises a request to merge the first branch line and the second branch line, wherein each of the first branch line and the second branch line comprises a respective set of filters;
the new version of filtration of the graph is based on the sets of filters of the latest versions of the first subset and the second subset of versions.

7. The method of claim 6 wherein:
based on the sets of filters of the latest versions of the first subset and the second subset of versions comprises based on at least one of:
a union of the sets of filters of the latest versions;
an intersection of the sets of filters of the latest versions;
a difference between the sets of filters of the latest versions.

8. The method of claim 6 wherein a request to merge the first branch line and the second branch line comprises an indication of a version of a respective subset of versions of a particular branch line of the first branch line and the second branch line that is not a latest version of the respective subset of versions of the particular branch line.

9. The method of claim 1 further comprising displaying, in response to receiving an interactive selection of an other version indicator of the plurality of version indicators, at least one of:
a filter from which a specific version that is represented by the other version indicator is based;
a count of at least one of: vertices within the specific version of filtration of the graph, or edges within the specific version of filtration of the graph.

10. The method of claim 1 wherein:
the timeline comprises at least one of: a scatter plot, or a line chart;
the independent axis of the timeline represents time;
the dependent axis of the timeline represents a count of graph elements for versions of filtration of the graph;
a location of the particular version indicator along the dependent axis of the timeline indicates a count of graph elements in a version of filtration of the graph that the particular version indicator represents.

11. The method of claim 10 wherein:
the method further comprises displaying within the timeline a threshold line that is parallel to an independent axis of the timeline;
the location of the threshold line indicates a threshold for a count of graph elements of the graph that satisfy filtration;
displaying the particular version of filtration of the graph that is represented by the particular version indicator comprises displaying, when a count of graph elements for the particular version of filtration of the graph exceeds the threshold, a simplification of the graph that contains a graph element that represents multiple elements of the graph.

12. The method of claim 11 wherein displaying the simplification of the graph comprises:
sending, over a communication network from a client to a server, an identifier of the particular version of the graph that is represented by the particular version indicator;
receiving, by the client from the server, the simplification of the graph.

13. The method of claim 1 wherein:
the timeline comprises a slider along the independent axis of the timeline;
the slider comprises a scrubber;
the method further comprises displaying the scrubber in a same location along the independent axis of the timeline as the particular version indicator.

14. The method of claim 13 further comprising:
moving the scrubber along the slider in response to one of:
interactively dragging the scrubber, or automatically animating the scrubber;
displaying, when the scrubber moves into alignment with an other version indicator of the plurality of version indicators, the version of filtration of the graph that the other version indicator represents.

15. One or more non-transitory computer-readable media storing instructions that, when executed by one or more processors, cause:
loading metadata that describes a plurality of versions of filtration of a graph that contains a plurality of elements that includes vertices interconnected by edges;
displaying, along a first branch line, a first subset of a plurality of version indicators, wherein each version indicator of the plurality of version indicators is based on the metadata and represents a respective version of a first subset of the plurality of versions of filtration of the graph;
concurrently displaying, along a same timeline, the first branch line and a second branch line, wherein the second branch line originates from a version indicator of the first subset;
displaying, along the second branch line, a second subset of the plurality of version indicators that represents a second subset of the plurality of versions;
displaying, in response to receiving an interactive selection of a particular version indicator of the plurality of version indicators, a particular version of filtration of the graph that is represented by the particular version indicator.

16. The one or more non-transitory computer-readable media of claim 15 wherein:
the first subset of the plurality of version indicators represent a subset of versions of the plurality of versions;
said version indicator of the first subset represents a version that is not a latest version in said subset of versions.

17. The one or more non-transitory computer-readable media of claim 15 wherein the instructions, when executed by the one or more processors, further cause:
creating, in response to a user interaction, a new version of filtration of the graph;
displaying a version indicator that represents the new version upon a new branch line.

18. The one or more non-transitory computer-readable media of claim 17 wherein:
the first subset of the plurality of version indicators represent a first subset of versions of the plurality of versions;
the second subset of the plurality of version indicators represent a second subset of versions of the plurality of versions;
each of the first subset and the second subset of versions has a respective latest version that contains a respective set of filters;
the user interaction comprises a request to merge the first branch line and the second branch line, wherein each of the first branch line and the second branch line comprises a respective set of filters;
the new version of filtration of the graph is based on the sets of filters of the latest versions of the first subset and the second subset of versions.

19. The one or more non-transitory computer-readable media of claim 18 wherein:
based on the sets of filters of the latest versions of the first subset and the second subset of versions comprises based on at least one of:
a union of the sets of filters of the latest versions;
an intersection of the sets of filters of the latest versions;
a difference between the sets of filters of the latest versions.

20. The one or more non-transitory computer-readable media of claim 18 wherein a request to merge the first branch line and the second branch line comprises an indication of a version of a respective subset of versions of a particular branch line of the first branch line and the second branch line that is not a latest version of the respective subset of versions of the particular branch line.

21. The one or more non-transitory computer-readable media of claim 15 wherein:
the timeline comprises at least one of: a scatter plot, or a line chart;
the independent axis of the timeline represents time;
the dependent axis of the timeline represents a count of graph elements for versions of filtration of the graph;
a location of the particular version indicator along the dependent axis of the timeline indicates a count of graph elements that satisfy a version of filtration of the graph that the particular version indicator represents;

the instructions, when executed by the one or more processors, further cause displaying within the timeline a threshold line that is parallel to an independent axis of the timeline;

the location of the threshold line indicates a threshold for a count of graph elements of the graph that satisfy filtration;

displaying the particular version of filtration of the graph that is represented by the particular version indicator comprises displaying, when a count of graph elements for the particular version of filtration of the graph exceeds the threshold, a simplification of the graph that contains a graph element that represents multiple elements of the graph.

22. The one or more non-transitory computer-readable media of claim 21 wherein displaying the simplification of the graph comprises:

sending, over a communication network from a client to a server, an identifier of the particular version of filtration of the graph that is represented by the particular version indicator;

receiving, by the client from the server, the simplification of the graph.

23. The one or more non-transitory computer-readable media of claim 15 wherein:

the timeline comprises a slider along the independent axis of the timeline;

the slider comprises a scrubber;

the instructions, when executed by the one or more processors, further cause displaying the scrubber in a same location along the independent axis of the timeline as the particular version indicator.

24. The method of claim 1 wherein visual spacing between two version indicators of the plurality of version indicators proportionally represents an amount of time that elapsed between creation of two versions represented by the two version indicators.

* * * * *